United States Patent [19]

Akiyama et al.

[11] Patent Number: 4,730,255

[45] Date of Patent: Mar. 8, 1988

[54] ENGINE CONTROL APPARATUS

[75] Inventors: Susumu Akiyama, Kariya; Ito Katsunori; Yuzi Hirabayashi, both of Aichi; Masumi Kinugawa, Okazaki; Norio Omori, Kariya, all of Japan

[73] Assignee: Nippondenso Co., Ltd., Kariya, Japan

[21] Appl. No.: 737,088

[22] Filed: May 23, 1985

[30] Foreign Application Priority Data

May 28, 1984 [JP] Japan ............................ 59-107783

[51] Int. Cl.[4] ......................... G01F 1/68; F02D 5/00

[52] U.S. Cl. ............................ 364/431.05; 123/494; 73/204

[58] Field of Search ..................... 364/431.03, 431.04, 364/431.05, 510; 123/494; 73/204, 118.2

[56] References Cited

U.S. PATENT DOCUMENTS

| | | | |
|---|---|---|---|
| 3,906,207 | 9/1975 | Rivere et al. . | |
| 4,058,089 | 11/1977 | Schmidt et al. . | |
| 4,089,214 | 5/1978 | Egami et al. . | |
| 4,264,961 | 4/1981 | Nishimura et al. | 123/494 |
| 4,304,129 | 12/1981 | Kawai et al. . | |
| 4,409,828 | 10/1983 | Kohama et al. | 73/204 |
| 4,523,284 | 6/1985 | Amano et al. | 73/204 |

FOREIGN PATENT DOCUMENTS

| | | | |
|---|---|---|---|
| 1356986 | 2/1964 | France . | |
| 2473236 | 10/1981 | France . | |
| 55-104538 | 8/1980 | Japan . | |
| 56-51618 | 5/1981 | Japan . | |
| 0092330 | 7/1981 | Japan | 123/494 |
| 0010415 | 1/1982 | Japan | 73/204 |
| 0002436 | 1/1982 | Japan | 123/494 |
| 0056632 | 4/1982 | Japan | 123/494 |
| 58-95214 | 6/1983 | Japan . | |

*Primary Examiner*—Parshotam S. Lall

*Attorney, Agent, or Firm*—Cushman, Darby & Cushman

[57] ABSTRACT

An engine control apparatus for controlling the quantity of fuel injected into the engine is equipped with an intake air flow rate measuring device for detecting the operating state of the engine. This measuring device has a heat sensitive element, which is located in the intake pipe, and outputs a pulse signal having a pulse width T corresponding to the intake fuel amount. Engine control apparatus has a plurality of map memory means in which a plurality of functions $f_1(N)$, $f_2(N)$, $f_3(N)$, which express the polynomial approximation $$G/N = \sum_{a} a_n \cdot T^n$$

for expressing the air flow rate G/N per engine revolution, are stored as the parameters of the number of engine rotations N. These functions are read out from the maps and, based on the number of engine rotations N, the fuel injection amount corresponding to the pulse width T of the air flow rate is calculated.

6 Claims, 14 Drawing Figures

F I G. 4
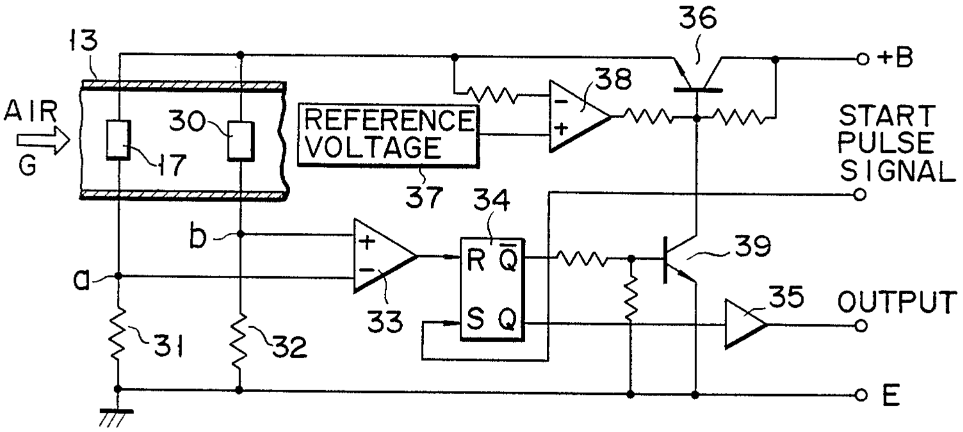
F I G. 5A
F I G. 5B
F I G. 5C
F I G. 5D
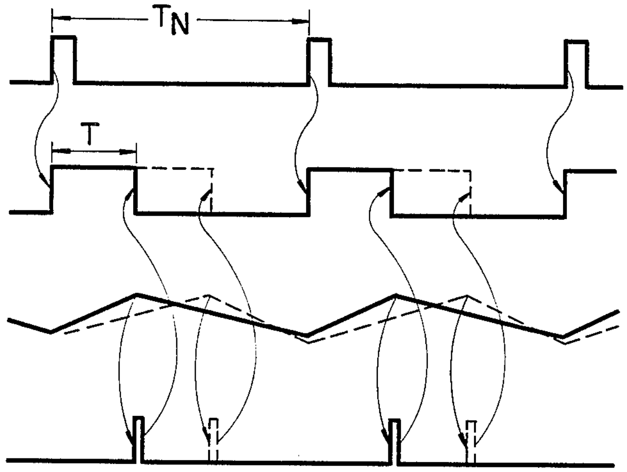

ENGINE CONTROL APPARATUS

BACKGROUND OF THE INVENTION

This invention relates to an engine control apparatus, and, in particular, to an electronic control device which uses a microprocessor for performing control computations of the amount of fuel to be injected, by effectively using an air intake flow measurement signal.

When an engine is controlled by an electronic control device such as a microprocessor, the operating state of the engine is always monitored, the fuel injection amount in relation to the operating state of the engine is computed, and the amount of fuel is injected.

The monitoring means for controlling the running of the engine in this way, include rotation speed sensors, temperature sensors, and throttle opening sensors, etc. There is also an apparatus for measuring the intake air flow rate for direct computation of the fuel injection quantity. Heat-wire type intake air flow sensors are commonly used for apparatuses having this kind of purpose. These sensors are provided in the intake pipe and comprise a heat sensitive element which is electrically heated. Namely, this heat sensitive element is heated by electricity and cooled by the flow of air in the intake pipe, the thermal variation characteristics of the element corresponding to the intake air flow.

The electronic control unit for the engine typically comprises a microcomputer. In order to compute the fuel injection quantity suitable for the running state of the engine, it is desirable that the detection signals supplied to the control unit be digital. This means that the air flow measurement signal from the air flow measuring device should be digitalized.

In consideration of this, the air flow signal is in pulse form and the measured air flow is expressed as the pulse width of the signal. This kind of measurement signal can be effectively used for computations by the microcomputer by turning the air intake flow into a numerical value by the use of a clock signal to turn the pulse width into a numerical value.

SUMMARY OF THE INVENTION

An object of this invention is to provide an engine control apparatus which can easily compute and control the fuel injection quantity, etc. in an engine control unit comprising a microcomputer on the basis of the intake conditions such as the intake air flow rate.

Another object of this invention is to provide an engine control apparatus which can detect the air flow rate in the intake pipe of an engine and output a digital detection signal, and can effectively compute and control the fuel injection quantity, etc. in an engine control unit comprising a microcomputer, etc. based on this detection signal.

Still another object of this invention is to provide an engine control apparatus, which supplies the measurement signal of the intake air flow rate to the microcomputer, the control program of which can simply and accurately control the engine.

Yet another object of this invention is to be able to simply compute the air flow rate (G/N) for one engine revolution using simple means which uses a polynomial approximation, and to obtain accurate engine control data of the fuel injection amount, etc. based on this computation result, for performing engine control.

According to the engine control apparatus of the present invention, there is provided an intake condition measuring device used for detecting the conditions of the intake air flow rate to the engine. This device is constructed, for example, in the following manner. A heat sensitive element as the flow sensor, whose resistance value varies with changes in temperature, is installed in the air intake pipe. Heating power is generated synchronously with the rotation of the engine to heat the heat sensitive element and to cut off the power supply when the element reaches a specified temperature. A pulse signal for expressing the length of time T that the heating power is supplied is output as the measurement signal. A plurality of functions, which comprise the polynomial approximations of the air flow rate G/N which is an approximation obtained from the time length T and the engine speed N, are stored in a one-dimensional map as the parameters of the rotational speed N of the engine. The functions are read out of the one-dimensional map and the G/N calculated based on the engine speed. Engine control data such as the fuel injection quantity and the ignition timing are computed based on this G/N.

Accordingly, the measurement output signal, which indicates the time length corresponding to the air flow rate of the engine and is output from the air flow measuring apparatus, is effectively used to perform a simple computation of the fuel injection quantity. Based on the functions read out from a simple one-dimensional map as the engine speed parameters, simple and highly accurate interpolation calculations of the G/N can be made. This has the effect of greatly simplifying the control and the control system for the engine.

BRIEF DESCRIPTION OF THE DRAWINGS

The description of this invention can be further understood by reference to the drawings in which:

FIG. 4 is a circuit diagram of the intake air flow measurement apparatus;

FIGS. 5A to 5D are signal waveform diagrams showing different states of the measurement operation;

DETAILED DESCRIPTION OF THE PREFERRED EMBODIMENT

Figure 1:
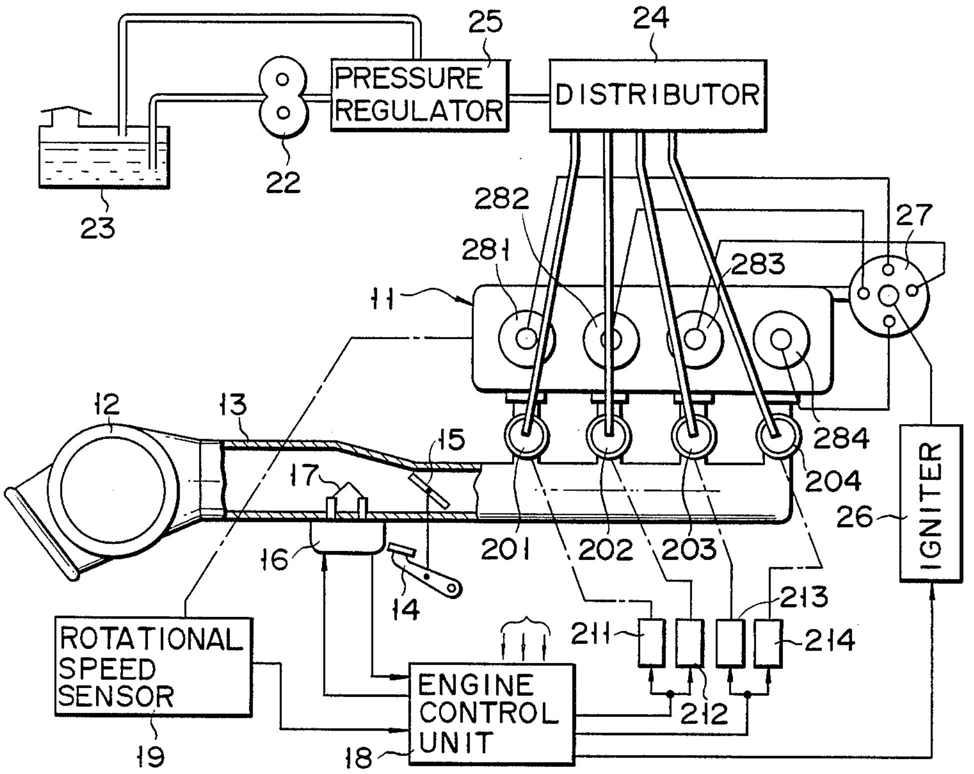
FIG. 1 shows the engine control system for the control apparatus of the first embodiment of the invention.

FIG. 1 shows the control system of engine 11. This system electronically calculates and controls the fuel injection amount suitable for the particular engine running state.

The air is sucked in through air filter 12 and guided to engine 11 via intake pipe 13. This air is supplied to each of the cylinders via throttle valve 15 which is operated by accelerator pedal 14. Heat sensitive element 17, the temperature of which is electrically controlled, is located inside intake pipe 13, and is constructed of a heater, such as a platinum wire, whose resistance value varies in response to variations in temperature.

The signal from intake air flow rate measuring apparatus 16 is supplied to control unit 18, which comprises a microcomputer. Power for heating is supplied to heat sensitive element 17 by command from control unit 18.

The output signal from engine rotation speed sensor 19, the coolant temperature sensor signal (not shown), and the air/fuel ratio detection signal are supplied to engine control unit 18 indicating the running state of the engine. Based on these detection signals, the optimum fuel amount for the particular running state of the engine is calculated and a fuel injection timing signal is sent via resistors 211 to 214, respectively, to fuel injectors 201 to 204, which are provided for each cylinder. The supply of fuel at a constant pressure to fuel injectors 201 to 204 is set and the injection of a set amount of fuel, when the injectors are open, is controlled by an injection signal. The fuel is supplied from tank 23 by fuel pump 22 via fuel distributor 24. The pressure of the fuel is kept constant by pressure regulator 25 and the fuel amount is accurately controlled by the opening period of the injectors.

Engine control unit 18 sends a command to igniter 26, and an ignition signal is supplied to spark plugs 281 to 284 via distributor 27 to control the operation of the engine by setting the ignition at a timing suitable for the particular engine conditions in response to the detection signals.

Figure 2:
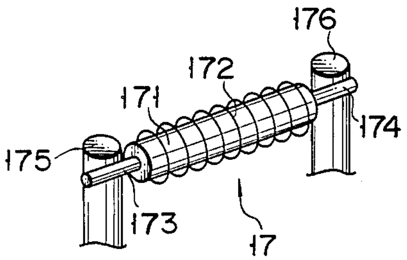
FIG. 2 and FIG. 3 are detailed drawings of the heat sensitive element which constitutes the intake air flow measurement apparatus used in the engine control system.

FIG. 2 shows heat sensitive element 17 of intake air flow rate measurement apparatus 16 used in the engine control system. A resistance wire 172, such as a platinum wire, having certain thermal characteristics is wound around ceramic bobbin 171. The bobbin is supported by conductive shafts 173, 174 protruding from both ends and located on conductive pins 175, 176. Heating power is supplied to resistance wire 172 via pins 175, 176. The resistance wire portion is positioned in the air flow of intake pipe 13.

Figure 3:
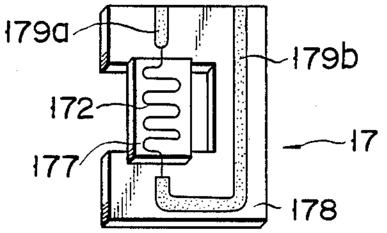

FIG. 3 shows another example of heat sensitive element 17. Resistance wire 172, which is the heat generating body with special thermal characteristics, is formed by printing a wire on an insulative film 177, which is supported by insulative substrate 178. Wires 179*a*, 179*b* are formed on substrate 178, connected to resistance wire 172 for the supply of heating power.

FIG. 4 is a circuit diagram of intake air flow rate measurement apparatus 16. Heat sensitive element 17 and auxiliary heat sensitive element 30 are fastened inside intake air pipe 13. Auxiliary element 30 also has a resistance wire such as a platinum wire, the resistance of which varies in response to the temperature of the air flow, making it a means for measuring the air temperature. Heat sensitive elements 17 and 30 together with fixed resistors 31 and 32 constitute a bridge circuit. The nodes of resistors 31 and 32, and heat sensitive elements 17 and 30, which are output terminals, are connected to the input terminals comparator 33. When the temperature of heat sensitive element 17 rises higher above the temperature of the air, as measured by heat sensitive element 30, than a specified temperature range, a signal is output from comparator 33.

This output signal from comparator 33 resets flip-flop circuit 34, which is set by the start pulse signal sent from engine control unit 18 (not shown). The signal output from rotational speed sensor 19 synchronous with the rotation is detected by control unit 18 which then generates a start pulse also synchronous with the rotation of the engine.

Flip-flop circuit 34 is set synchronous with the rotation of the engine and reset when the temperature of heat sensitive element 17 rises to a specified temperature. Flip-flop circuit 34 generates a pulse signal the width of which corresponds to the time between the set and reset operations. This output signal is output via buffer amplifier 35 as the output signal of the measurement apparatus.

Transistor 36 turns on and off the supply of power to the bridge circuit, which includes heat sensitive element 17. Differential amplifier 38 to which a reference voltage is supplied from reference voltage generator 37 monitors the voltage of the power supplied to the bridge circuit and controls the base potential of transistor 36. In this way the voltage value of the power sent to the bridge circuit is set at the reference value. The power sent to the bridge circuit is used for heating heat sensitive element 17.

The base of transistor 37 is connected to the collector of transistor 39, which is grounded at the emitter. The base of transistor 39 is supplied with a high-level signal when flip-flop circuit 34 is reset. Thus when flip-flop circuit 34 is reset transistor 39 is turned on, whereby the base of transistor 36 is grounded via transistor 39. As a result, transistor 36 is turned off, and no electric power is supplied to heat sensitive element 17.

The start pulse signal shown in FIG. 5A is generated synchronously with the rotation of the engine, flip-flop circuit 34 is set corresponding to this signal and the output signal from set terminal Q rises as shown in FIG. 5B. With the rise of this signal, transistor 36 is turned on and power is supplied to heat sensitive element 17. When this constant voltage power is supplied, heat sensitive element 17 heats up and the temperature rises as shown in FIG. 5C. In this case, the temperature rise velocity is determined by the cooling effect of the air flow on heat sensitive element 17; the greater the air flow, the slower temperature rise velocity, and the smaller the flow, the greater the velocity.

With the rise in temperature of heat sensitive element 17, the resistance value also increases so the voltage at node a drops lower than the voltage at node b, and the output signal from comparator 35 rises. Namely, when the temperature of heat sensitive element 17 rises to a set temperature difference over the air temperature as measured by auxiliary heat sensitive element 30, the signal from comparator 33 rises as shown in FIG. 5D and resets flip-flop circuit 34 turning off transistor 36 so that power to element 17 is turned off.

In other words, after the start pulse signal has caused the heating power to the heat sensitive element 17 to rise, the power supply is continued during the time period until element 17 reaches a specified temperature. This signal, corresponding to this time period, is output from flip-flop circuit 34. Because the temperature rise velocity of element 17 corresponds to the air flow rate in intake pipe 13, the time length of the setting of flip-flop circuit 34 indicates the air flow rate. The output signal of flip-flop circuit 34, as shown in FIG. 5B, is the measurement signal of the air flow rate in intake pipe 13, and is expressed by time length T and cycle $T_N$. This signal is supplied to engine control unit 18 to be used in the computation of the fuel injection amount.

The pulse width T of this measurement signal, which corresponds to the measured air flow rate, can be expressed as follows.

Assuming the voltage of the heating power supplied to heat sensitive element 17 to be V, the average current value to be i, the heat-transfer coefficient to be h, the cooling area of heat sensitive element 17 to be A, the temperature of element 17 to be $T_H$, the air temperature to be $T_A$, the resistance of element 17 to be $R_H$, the air flow rate to be G and the temporary current during current flow to element 17 to be $I_O$, then $$V \cdot i = h \cdot A(T_H - T_A)$$
$$V = i_0 \cdot R_H$$

$$h = \alpha + \beta \sqrt{G}$$

$$i = i_0 \cdot (T/T_N),\ T_N \propto 1/N$$

From this $$(V^2/R_H) \cdot (T/T_N) = (\alpha + \beta\sqrt{G}) \cdot (T_H - T_A) \cdot A$$

voltage V and ($T_H$-$T_A$) are kept constant so time length T can be expressed as follows:

$$T \propto (\alpha + \beta\sqrt{G})/N \qquad (1)$$

where $\alpha$ and $\beta$ are constants and N is the rotational speed of the engine.

With this pulse width T of the measurement signal, the air flow rate G/N corresponding to the number of engine rotations is determined, and engine control unit 18 then determines the fuel injection time length corresponding to the fuel injection amount. However, the microcomputer control program for calculating G/N is extremely complicated.

The following is a simple means for accurately calculating the intake air flow rate per engine rotation G/N.

First, equation (1) for G/N is changed to the following theoretical equation:

$$G/N \propto N(T - \alpha/N)^2/\beta^2 \qquad (2)$$

When the difference between the theoretical equation and the actual control are taken into consideration and an approximation made, it can be expressed by the following polynomial approximation. This polynomial approximation is sufficiently able to absorb the differences.

$$G/N = \sum_n a_n \cdot T^n \qquad (3)$$

where n=2 and G/N is as follows:

$$G/N = a_2 \cdot T^2 + a_a \cdot T + a_0 \qquad (3')$$

If in equation (2), relationships $f_1(N) = N/\beta^2$ and $f_2(N) = \alpha/N$ stand, and the difference dependent upon the number of engine rotations N is represented by $f_3(N)$, equation (2) can be expessed as follows:

$$G/N = f_1(N)^2[T - f_2(N)]^2 + f_3(N) \qquad (4)$$
$$= f_1(N)^2 \cdot T^2 - 2f_2(N) \cdot f_1(N)^2 \cdot T + f_1(N)^2 \cdot f_2(N)^2 + f_3(N)$$

accordingly, coefficients $a_0$, $a_1$ and $a_2$ in equation (3') are expressed as follows:

$$a_0 = f_1(N)^2 \cdot f_2(N)^2 + f_3(N)$$

$$a_1 = -2f_2(N) \cdot f_1(N)^2$$

$$a_2 = f_1(N)^2$$

This shows that it is possible to calculate the intake air flow rate per engine rotation G/N by a simple calculation which uses the numerical valves of $f_1(N)$, $f_2(N)$, $f_3(N)$ responsive to the number of engine rotations and determining coefficients $a_0$, $a_1$ and $a_2$, and pulse width T of the measurement signal.

Figure 6:
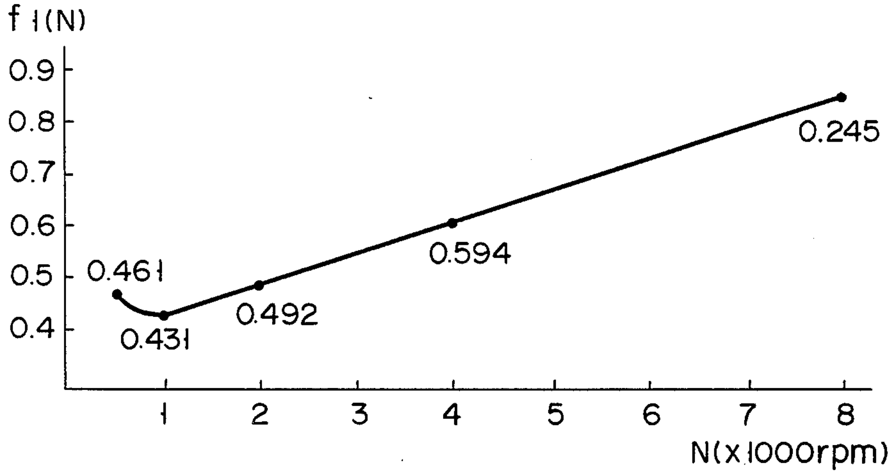
FIGS. 6 to 8 show the memory contents of the one-dimensional map in which the functions indicating the different polynomial approximations are stored as parameters of the number of engine revolutions N.
Figure 7:
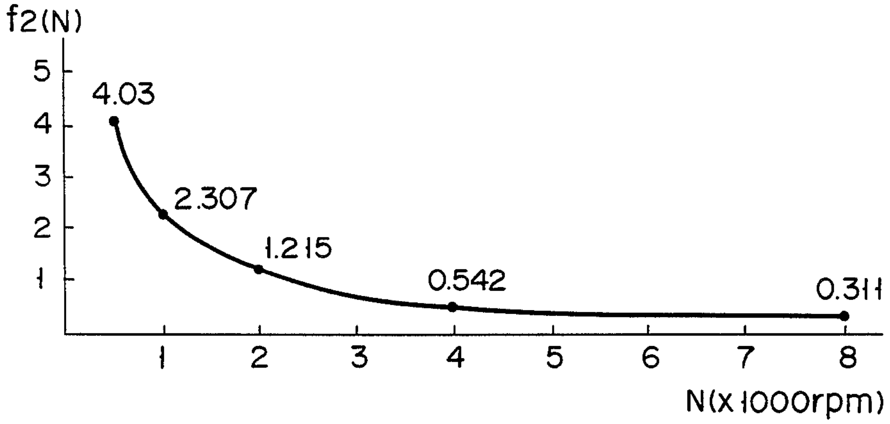
Figure 8:
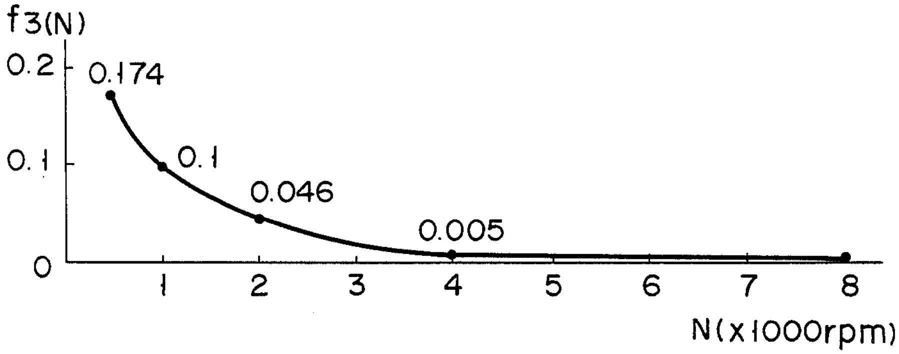

FIGS. 6 to 8 show experimental data representing the relationship between the above functions and engine rotation number of a 4-cylindered engine. The contents of FIGS. 6 to 8 are stored in the memory device as a one-dimensional map.

Figure 9:
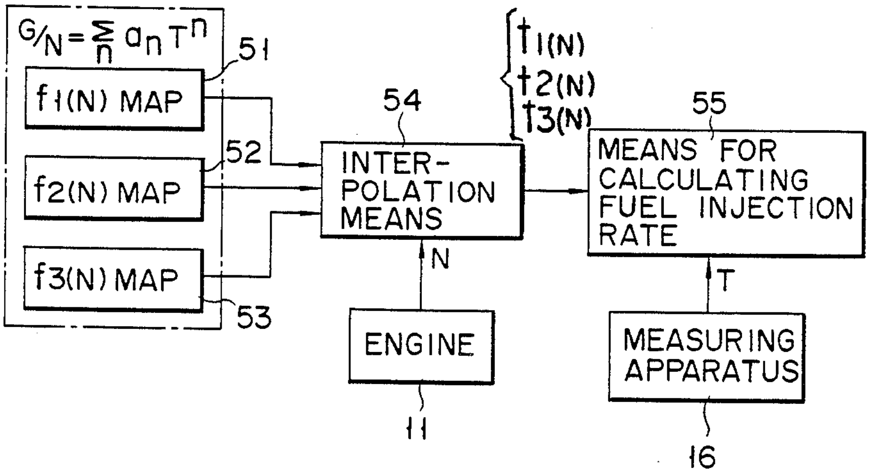
FIG. 9 is a simplified schematic of the G/N derivation means and the fuel injection quantity calculation means.

As shown in FIG. 9, functions $f_1(N)$, $f_2(N)$, $f_3(N)$ determining coefficient $a_n$ (i.e., $a_0$, $a_1$, $a_2$) in equation (3) are stored in function memory devices 51–53 as maps of the parameters of the number of engine rotations N shown in FIGS. 6–8, corresponding to these functions. Interpolation calculation means 54 performs interpolation calculation of numerical values of functions $f_1(N)$, $f_2(N)$ and $f_3(N)$, which are responsive to the number of engine rotations performs interpolation calculation of numerical values of functions $f_1(N)$, $f_2(N)$ and $f_3(N)$, which are responsive N and determine coefficients $a_0$, $a_2$ and $a_3$, by using the maps. The calculated values of functions $f_1(N)$, $f_2(N)$ and $f_3(N)$ and pulse width T of the measurement signal from intake air flow rate measuring apparatus 16 are supplied to the fuel injection ratio calculation means 55 so that the intake air flow rate per engine rotation G/N is calculated based on the values of the functions and pulse width T and by using equation (4). Based on G/N thus calculated, the fuel injection quantity is calculated.

Figure 10:
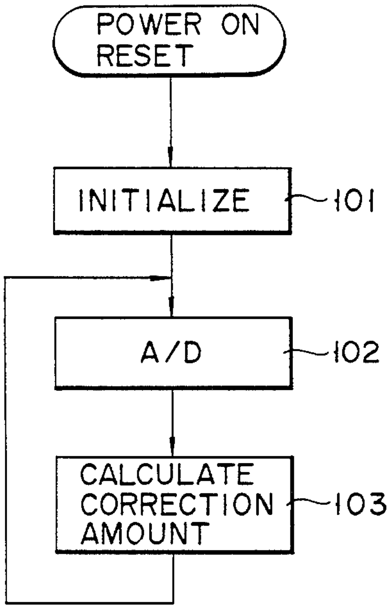
FIG. 10 is a flowchart of the main routine of the control unit of the control apparatus.

FIG. 10 is the base processing of the main control routine of engine control unit 18. First, when the power is turned on, the device is reset, and, in step 101 initialization is executed. After initialization, analog detection of the engine operating state, such as coolant temperature, air temperature, exhaust gas oxide content and battery voltage, etc. is performed, and this data is A/D converted and supplied as digital data in step 102. In step 103, various correction amounts corresponding to these detection signals are calculated and used in the correction calculations of the fuel injection time length, for example.

Figure 11:
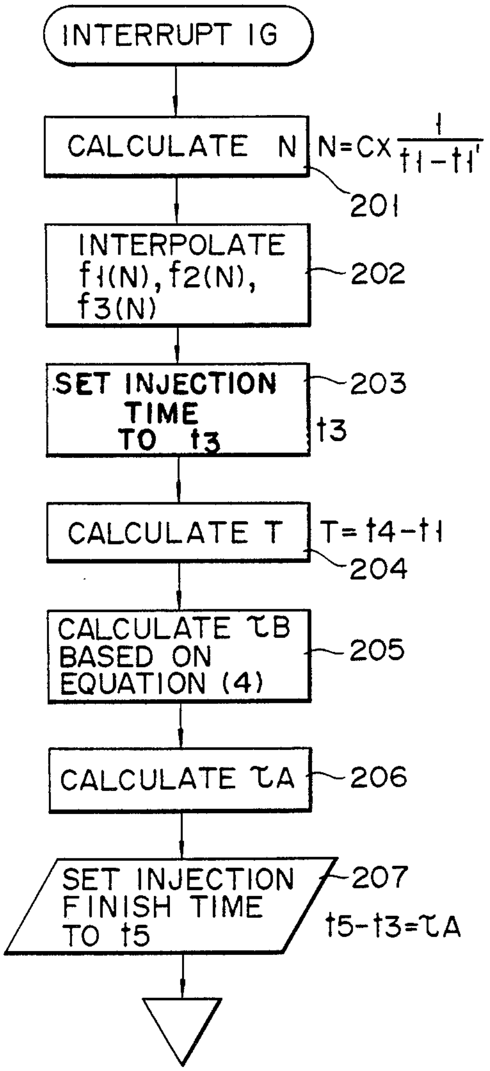
FIG. 11 is a flowchart of fuel injection quantity calculation routine.

FIG. 11 is a flow chart for the means for determining the amount of fuel, in actuality, the fuel injection time length, in response to the operating state of the engine. This calculation routine is interrupted in response to the signal that is synchronous with the rotation of the engine, i.e., ignition signal IG.

First, in step 201, the count value t1 of the counter, which operates in the free state, is read out in response to signal IG and is compared to count value t1' read out in response to the previous signal IG. That is, a count value corresponding to the IG signal generation interval is calculated and the number of rotations of the engine is detected.

Next, in step 202, based on the number of rotations N detected in step 201, numerical values of functions $f_1(N)$, $f_2(N)$, $f_3(N)$, such as those shown in FIGS. 6 to 8, from map memory device 51–53 are interpolated and, in step 203, the fuel injection timing t3 which is determined by a predetermined trigger signal synchronous with the engine rotation for initiating the fuel injection is set.

Air flow rate measurement apparatus 16 controls the rise of the heating power to element 17 by applying a start pulse signal generated at timing t1 corresponding to signal IG. In step 204, timing t4 of the drop of the pulse output signal from measurement apparatus 16 is detected and the time length T corresponding to the air flow rate measurement value is calculated (t4–t1).

Next, in step 205, intake air flow rate per engine rotation G/N is calculated on the basis of the numerical values of functions $f_1(N)$, $f_2(N)$ and $f_3(N)$, obtained in step 202, and time length T calculated in step 204 using equation (4). Then based on the calculated G/N, the basic fuel injection time width $\tau B$ (where $\tau B=K\times(G/N)$, K:coefficient) is calculated. In step 206, a correction is executed corresponding to the correction amount obtained in step 103 of the main routine, and the actual fuel injection time width $\tau A$ is calculated. After injection time length $\tau A$ is calculated in this manner, the injection finish timing t5 corresponding to fuel injection timing t3 is set instep 203 is set in step 207. Timing t5 is calculated from ($t5-t3=\tau A$).

If points in the maps shown in FIGS. 6 to 8 are divided by 13 to give values of 500, 625, 750, 1000, 1250, 1500, 2000, 2500, 3000, 4000, 5000, 6000, 8000, it is possible to ensure a sufficient degree of control accuracy.

On the other hand, if equation (2), which expresses the air flow rate G/N per engine rotation, is used to obtain a B 2-dimensional map of the time length T and the number of rotations N, it is necessary to divide the point of 50 to obtain the error range of ±35 2% for the time length T and number of rotations N required to ensure the required accuracy. Consequently, there are many map setting points and many points that are not used, which is very uneconomical.

In the above embodiment, air flow rate measurement apparatus 16 supplies heat power to heat sensitive element 17 at a constant voltage setting. It is, however, possible to supply the heating power at a constant current, instead. Namely, a constant current heating power is supplied to heat sensitive element 17 whose temperature increases at a velocity corresponding to the measured air flow rate. When element 17 reaches a specified temperature, this is detected. By this detection operation it is possible to obtain a measurement output signal for pulse time width T, the same as with the previous embodiment.

In the embodiment described above, the intake condition measuring device detects the intake air flow rate, and based on this air flow rate G/N the injection quantity of fuel is calculated. However, the intake condition measuring device may be adapted to detect the intake air pipe pressure P. In this case, the fuel injection time ($\tau_B(=K\times f(P,N))$) is obtained from the intake air pipe pressure P and engine rotation number N by a method similar to that used in the above embodiment.

What is claimed is:

1. An engine control apparatus comprising:

an intake condition measuring device which is formed by means supplying a heating current to a temperature sensing element in accordance with a start pulse signal synchronous with the engine rotation, automatically stopping the supply of the heating current when the temperature of the element rises to a predetermined value, and generating an output pulse signal having a width T corresponding to the period during which the heating current has been supplied to the element;

means for detecting a number of engine rotations;

a plurality of map memory means for storing, in the form of a one-dimensional map, a plurality of functions $f_n(N)$, respectively, determined based on the number of engine rotations;

interpolation calculation means which, by using said plurality of map memory means, performs interpolation calculation of the numerical values of functions $f_n(N)$, based on the number of engine rotations detected by said engine rotation number detecting means, for determining a plurality of coefficients $a_n$ in a polynomial approximation of $$G/N = \sum_n a_n \cdot T^n,$$

which expresses an intake air flow rate per engine rotation G/N by means of width T of the output pulse signal of the intake condition measuring device;

fuel injection quantity calculation means for calculating the intake air flow rate per engine rotation G/N, on the basis of the numerical values of functions $f_n(N)$, calculated by the interpolation calculation means for determining the coefficients $a_n$, and the width T of the output pulse signal of the intake condition measuring device, and by using the polynomial approximation $$G/N = \sum_n a_n \cdot T^n,$$

and for calculating a fuel injection quantity on the basis of the calculated intake air flow rate per engine rotation G/N; and fuel injection means for supplying an engine with a quantity of fuel corresponding to the fuel injection quantity calculated by the fuel injection quantity calculation means.

2. An apparatus according to claim 1, wherein said temperature sensing element is arranged inside an intake pipe of the engine and exposed to an intake air flow therein.

3. An apparatus according to claim 1, wherein said intake condition measuring device further comprises an auxiliary temperature sensing element arranged in said intake pipe to detect the temperature of the intake air, a comparator for comparing the temperature of the intake air which is detected by said auxiliary temperature sensing element and the temperature of said temperature sensing element, and detecting that a difference between the temperature exceeds a predetermined difference, means for generating a pulse signal which rises in response to the periodically generated start pulse signal and which falls in response to an output signal from said comparator, and means for generating the pulse signal as an air flow rate measurement signal.

4. An apparatus according to claim 3, wherein the heating power supplied to said temperature sensing element has a constant voltage regulated by a reference voltage source.

5. An apparatus according to claim 1, wherein said polynomial approximation $$G/N = \sum_n a_n \cdot T^n$$

is expressed as $G/N = f_1(N)^2 \cdot T^2 - 2f_2(N) \cdot f_1(N)^2 \cdot T + f_1(N)^2 \cdot f_2(N)^2 + f_3(N)$, where n is 2, and the relationship of functions $f_1(N)$, $f_2(N)$, $f_3(N)$, which express this equation, with number of engine rotations N is found experimentally and are stored as parameters of number of engine rotations N in said plurality of map memory means as a one-dimensional map.

6. An apparatus according to claim 5, wherein points corresponding to engine speeds 500, 625, 750, 1000, 1250, 1500, 2000, 2500, 3000, 4000, 5000, 6000 and 8000 (rpm) are set in said map memory means, and functions corresponding to these points are also stored in the map memory means.

* * * * *

UNITED STATES PATENT AND TRADEMARK OFFICE
CERTIFICATE OF CORRECTION

PATENT NO. : 4,730,255

DATED : Mar. 8, 1988

INVENTOR(S) : Susumu Akiyama, Katsunori Ito, Yuzi Hirabayashi, Masumi Kinugawa, Norio Omori It is certified that error appears in the above-identified patent and that said Letters Patent is hereby corrected as shown below:

On the Title Page:

Change "[75] Inventors: Susumu Akiyama, Kariya; Ito Katsunori; Yuzi Hirabayashi, both of Aichi; Masumi Kinugawa, Okazaki; Norio Omori, Kariya, all of Japan" to --[75] Inventors: Susumu Akiyama, Kariya; Katsunori Ito; Yuzi Hirabayashi, both of Aichi; Masumi Kinugawa, Okazaki; Norio Omori, Kariya, all of Japan--

Signed and Sealed this

Twelfth Day of July, 1988

*Attest:*

DONALD J. QUIGG

*Attesting Officer*

*Commissioner of Patents and Trademarks*